United States Patent [19]
Rector, III

[11] Patent Number: 5,109,947
[45] Date of Patent: May 5, 1992

[54] DISTRIBUTED SEISMIC ENERGY SOURCE

[75] Inventor: James W. Rector, III, Los Altos Hills, Calif.

[73] Assignee: Western Atlas International, Inc., Houston, Tex.

[21] Appl. No.: 718,961

[22] Filed: Jun. 21, 1991

[51] Int. Cl.⁵ ............................................... G01V 1/40
[52] U.S. Cl. ..................................... 181/106; 367/57; 181/104
[58] Field of Search ..................... 181/102, 104, 106; 367/40, 57, 25, 911

[56] References Cited

U.S. PATENT DOCUMENTS

| | | | |
|---|---|---|---|
| 4,718,048 | 1/1988 | Staron et al. | 367/40 |
| 4,829,489 | 5/1989 | Rector | 367/82 |
| 4,862,423 | 8/1989 | Rector | 367/40 |
| 4,965,774 | 10/1990 | Ng. et al. | 367/40 |
| 5,031,158 | 7/1991 | Chamuel | 181/106 |

OTHER PUBLICATIONS

Dareing, D. W., "Vibrations increase available power at the bit", *Technology*, Oil & Gas Journal, Mar. 5, 1984.

*Primary Examiner*—Ian J. Lobo
*Attorney, Agent, or Firm*—William A. Knox

[57] ABSTRACT

A drill string in a fluid-filled borehole acts as a waveguide for an extensional wavefield that is generated in the drill string when it is excited by the vibrations of a drill bit secured to the lower end of the drill string. The waveguide acts as a distributed acoustic energy source which initiates head waves in the surrounding formation. The head waves are detected at one or more discrete locations near the surface of the earth. The extensional wavefield is detected by a sensing means mounted at the top of the drill string. The detected head waves are cross-correlated with the detected extensional waves to create a cross-correlogram which may be displayed.

19 Claims, 2 Drawing Sheets

DISTRIBUTED SEISMIC ENERGY SOURCE

BACKGROUND OF THE INVENTION

1. Field of the Invention

This invention is directed to the science of Vertical Seismic Profiling (VSP) in a borehole that is being actively drilled into earth formations.

2. Discussion of the Prior Art

Vertical Seismic Profiling is a method for imaging subsurface formations in the general vicinity of a borehole. In one technique, a seismic receiver is lowered into the open hole to a plurality of discrete depth levels beneath the surface of the earth. At each depth level, a sound source or shot is triggered at or near the surface of the earth. The shot may be fired at one or more different locations that are horizontally offset from the well head. A recording means registers the travel time from each shot to the receiver at each assigned depth. The data are processed to obtain useful information about the subsurface formations.

In an alternate, somewhat more economical approach, the shot and receiver locations are reversed. One or more seismic receivers are located along the surface at selected horizontal offset distances from the wellhead and shots are triggered at a plurality of selected depth levels.

Both methods require that the drilling operation be shut down during the seismic research, a very expensive situation for both operator and investor.

In the process of drilling a well, a drill bit, sometimes consisting of toothed rollers, is mounted at the lower end of a rotating string of drill pipe. The rotating drill bit penetrates a formation by disintegrating the rock at the bottom of the hole, creating a considerable amount of vibration in the process. It would seem economical of rig time if the drill bit itself were used as a seismic energy source for VSP work, thereby avoiding rig down time.

U.S. Pat. No. 4,718,048 teaches a method for instantaneous acoustic logging within a well bore by making use of the energy produced by the drill bit. In essence, seismic receivers on the surface record the signals produced by the drill bit vibrations on a continuous basis. An accelerometer mounted at the top of the drill string records the drill bit vibrations as transmitted up the drill string. The accelerometer recording is cross-correlated with the signals recorded by the receivers to yield useful data about the subsurface formations.

There are certain problems in the above method. Some of those problems are addressed in U.S. Pat. No. 4,829,489, assigned to the assignee of this invention. In this patent there is taught a method for determining the drill string velocity. That quantity is needed in order to compensate the cross-correlations for progressive differences in the length of the drill string as the hole is deepened. U.S. Pat. No. 4,862,423 tells us how to reduce drill string multiples in the received field signals. Drill string multiples occur because vibrations are reflected repeatedly between discontinuities along the drill string as explained in the '423 patent. Drill string multiples are undesirable because they obscure the desired seismic events on a display.

In a recent paper that was published in Geophysics, v. 56, n. 5, May, 1991 by J. W. Rector III et al., the authors describe the field and analytical procedures useful in the employment of drill bit energy as a downhole seismic source. The reader is referred to that paper for its tutorial content.

All of the above methods consider the source of energy to be a discrete point source. I have discovered that the extensional waves propagating up the drill string due to the chattering of a drill bit at the lower end thereof, cause the entire drill string to act as a distributed seismic-energy source from which useful data can be obtained that are not available from discrete sources.

SUMMARY OF THE INVENTION

In this invention, there is provided an elongated waveguide that is characterized by a preselected extensional-wave phase velocity. The waveguide penetrates one or more earth formations. Means, such as a drill bit at the bottom of the waveguide, excites acoustic waves uniformly along the length of the waveguide so that seismic energy is radiated from the waveguide into the formation as a single extended wavefield. Preferably, the preselected phase velocity in the waveguide exceeds the formation velocity adjacent the drill string.

In an alternate embodiment of this invention, there is provided a system for vertical seismic exploration that includes a fluid-filled borehole that penetrates a plurality of formations, into which an elongated waveguide is inserted. The extensional-wave phase velocity in the waveguide is greater than the acoustic propagation velocity of selected wavefield components in the surrounding formation. Means are provided for exciting extensional waves distributed along the length of the waveguide for radiating acoustic energy therefrom into the earth formations adjacent the waveguide to generate head waves therein. Means are deployed horizontally near the surface of the earth for detecting, sampling and recording the so-generated head waves. A sensor is provided to concurrently detect, sample and record extensional waves traveling up the waveguide. The recorded head wave arrivals are cross-correlated with the concurrently-recorded extensional waves to produce cross-correlograms. The cross-correlograms may be displayed in the form of correlated arrival time as a function of receiver offset. Means are provided, in conjunction with the means for recording, for estimating the propagation velocity of the generated head waves initiated in at least some of the penetrated formations.

BRIEF DESCRIPTION OF THE DRAWINGS

These and other objects of this invention will be better understood by reference to the accompanying detailed description of the preferred embodiment and the drawings wherein like reference numbers are used to identify like elements.

DETAILED DESCRIPTION OF THE PREFERRED EMBODIMENT

As pointed out earlier in this specification, seismic energy sources customarily used for VSP operations from a deep well are point sources positioned at discrete depths within the hole or are designed to appear as point sources in the far field. In this disclosure, there is proposed a distributed seismic energy source wherein seismic energy is radiated into the formation as a single extended wavefield from more than one location along the length of the hole.

Figure 1:
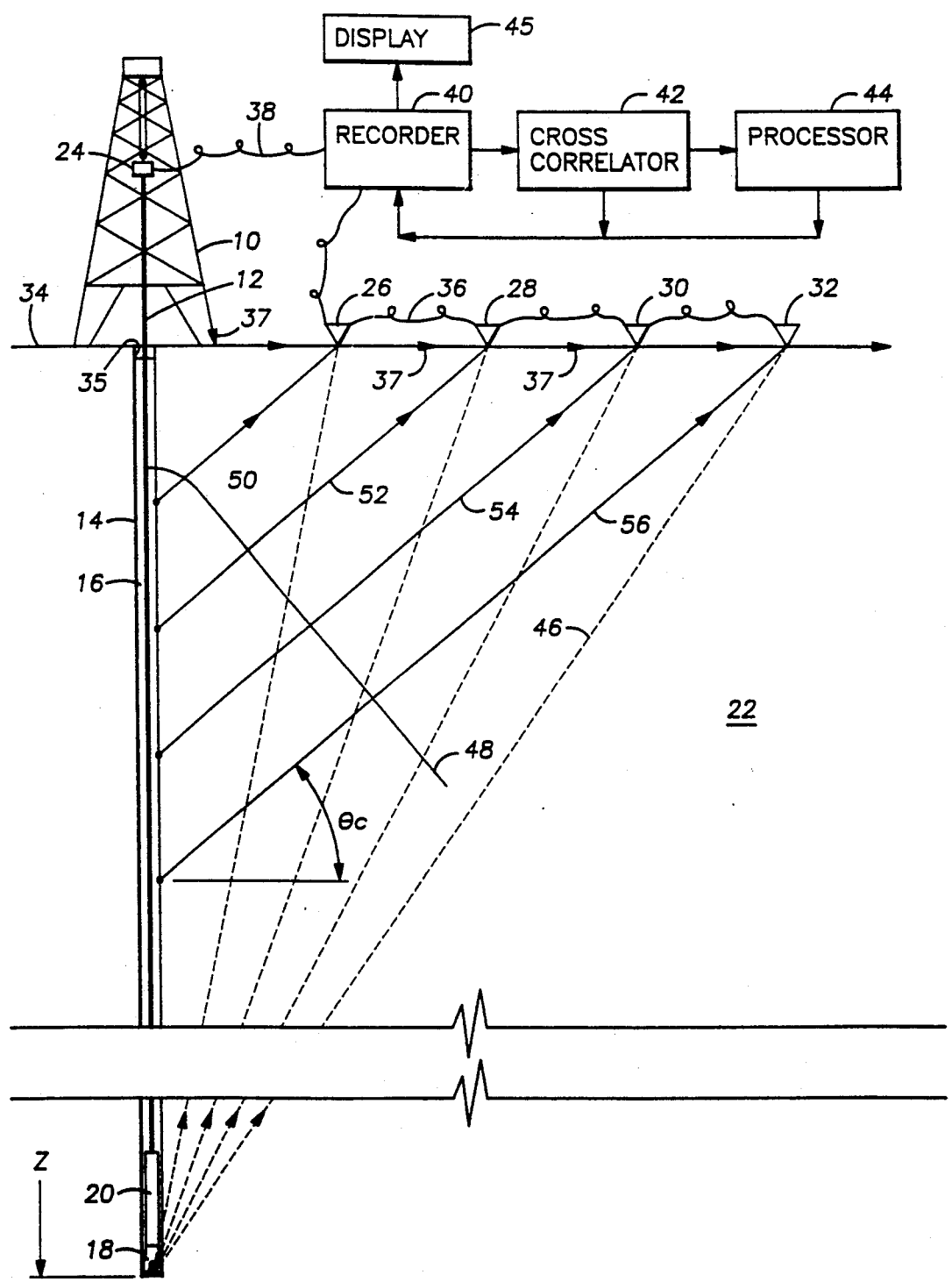
FIG. 1 illustrates the geometry of the ray paths of certain wavefields involved in this invention.

In FIG. 1, there is shown a drill rig 10. Rig 10 supports a string of sectionalized drill pipe 12 in the well or borehole 14 which is usually filled with a fluid 16 such as drilling mud. A drill bit 18 is secured to the lower end of drill string 12 by drill collars 20. The drill collars are used to apply weight to the drill bit to aid in crushing or disintegrating the rock at the bottom of the hole 14, thereby to penetrate the formation 22 to a required depth Z.

In operation, the drill string is rotated at rate that depends upon the type of formation being drilled. As the drill string turns, the respective teeth of the drill bit 18 impact the bottom-hole formation to produce a pseudo-random sequence of pulses. Some of the seismic energy that is generated by the drill bit radiates directly into the surrounding formation as compressional and shear wavefields. Some of the energy excites an extensional wavefield that travels up the drill string. The extensional wavefield is detected by a sensing means such as an accelerometer 24 mounted on the customary swivel at the top of the drill string 12.

A plurality of receiver arrays such as 26, 28, 30, 32, are distributed near the surface of the earth 34 in a substantially horizontal plane at increasing distances from the wellhead 35, that is, along the X coordinate. For purposes of this disclosure and for the sake of simplicity, it will be assumed that the receivers are vertically responsive to compressional waves, that the formation is isotropic and homogeneous and that the well bore is substantially vertical (in real life, of course, those assumptions may not necessarily be true).

The receivers detect seismic wavefields propagating through the sub-surface earth formation. The receivers are individually connected by a multi-conductor cable 36 to a multi-channel recording and storage device 40 such as a high-density computer disk. The recording device 40 samples and records the detected seismic waves for later processing. Accelerometer 24 is also connected to the recording device 40 by line 38. The extensional waves sensed by the accelerometer are sampled and recorded contemporaneously with the sampling of the seismic signals. The output from the recording device 40 is fed to a cross correlator 42 and thence to a data processor 44 whose output may be fed back to the recorder 40 if desired.

Drill bit 18 generates a plurality of wavefields: primary and multiple reflected waves, drill-string multiples, bottom-hole-assembly multiples, shear waves, compressional waves, direct arrivals, rig arrivals and so on. The respective wavefields can be identified on the basis of such parameters as signal amplitude, signal frequency content, stepout time or slope per unit distance and direction of the slope as a function of horizontal offset and/or drill bit depth. In FIG. 1, there are shown only those wavefields that are of interest to this invention.

Referring again to FIG. 1, an extensional wave train, traveling up drill string 12, will propagate through the structure of rig 10 and will be injected into the earth. The injected signals travel horizontally along shallow, near-surface earth layers, parallel to surface 34, to the respective receivers 26–32 as shown by ray path arrows 37. Those arrivals, when plotted as a function of time vs. offset distance will lie along a substantially straight line assuming no significant irregularities in the near surface layers. The slope of the line will be equal to $1/V_r$, where $V_r$ is the velocity of sound through one of the near-surface formations. Those arrivals will be termed "rig arrivals".

Some of the seismic energy travels directly from the drill bit to the receivers along a slant path such as 46 (dashed lines). Those arrivals will plot as hyperbolae on a time vs. offset-distance graph. Such arrivals will be designated as "direct arrivals". It is apparent by inspection of FIG. 1, that the arrival time of the direct waves is a function of the drill bit depth. For purposes of this disclosure, reflected arrivals from sub-bottom-hole earth layers will not be considered.

In a fluid-filled borehole, the drill string 12 acts as a waveguide for extensional waves excited by drill bit 18. When excited, the waveguide becomes an extended seismic source for generating a distributed wavefield. The material of the drill string is selected so that the drill string velocity $V_{ds}$ is greater than either the compressional-wave velocity $V_c$, or the shear wave velocity $V_s$, of the formation. Under that condition, the seismic energy will be refracted into the formation as a head wave.

In FIG. 1, the normal to the wave-front 48 of the head-wave makes an angle, with respect to the waveguide-axis-normal, of $\theta_c$, the critical angle, where $$\sin \theta_c = V_c/V_{ds} \tag{1}$$

for compressional waves and $$\sin \theta_s = V_s/V_{ds} \tag{2}$$

for shear waves. For simplicity, only compressional waves will be considered as represented by ray-paths 50–56. In FIG. 1, the ratio (1) is equal to 0.641, the critical angle is 40°, the drill string velocity is 15,600 feet per second (fps) and the formation velocity $V_f$ is about 10,000 fps. The dots at the intersections of the ray paths with the wall of well 14 are representative of an infinite number of emanation points of the seismic energy that is radiated by distributed energy source 12. The correlated arrival times of the refracted events will lie along a substantially straight line having a slope of $1/V_f$ when plotted on a graph of receiver offset distance vs. arrival time. The arrival times are independent of the drill bit depth.

In operation, extensional waves traveling up the drill string 12 are sensed by accelerometer 24 and converted to electrical output signals. The accelerometer output signals are delivered to recording device 40 where the signals are sampled and recorded.

The respective seismic wavefields are detected by the receivers as electrical output signals and, among other wavefields, include the rig arrivals, direct arrivals and refracted arrivals. The receiver output signals are sent to the recording device 40 where they are sampled and recorded by recording device 40.

The respective output signals as seen by each receiver channel, are cross correlated in cross correlator 42 with contemporaneously sampled accelerometer output signals on a channel-by-channel basis, by any well-known cross-correlation algorithm such as disclosed in the reference patents previously cited. The correlograms are sent back to the recording device 40 which may be coupled to a display device 45. The correlograms may be displayed by any well-known means as a suite or profile of time-scale recordings or traces, one trace per channel. The display may be in terms of travel time vs. receiver offset for a fixed drill-bit depth or travel time vs. drill-bit depth at a fixed offset, or in any other desired format.

Figures 2, 3:
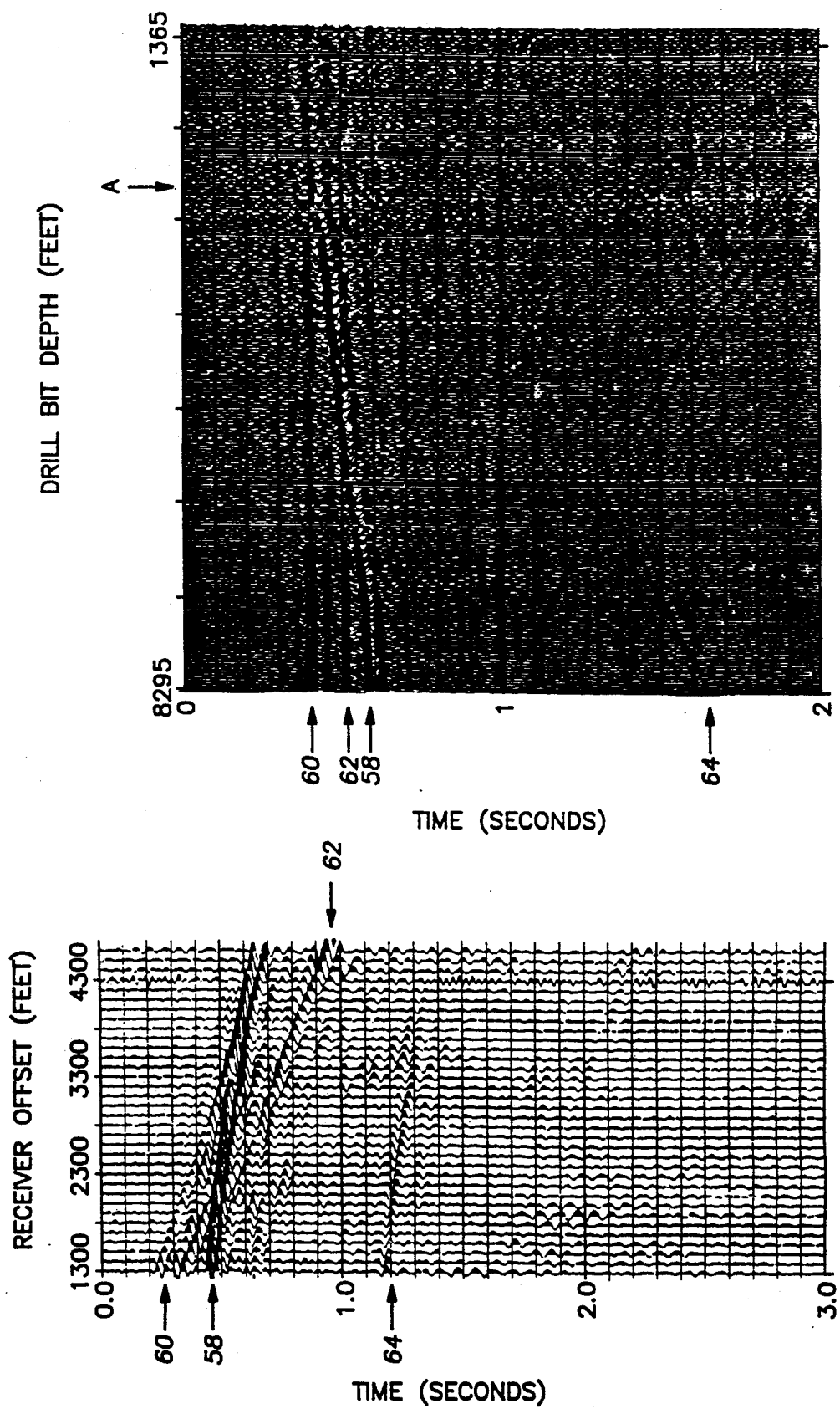
FIG. 2 is a display showing seismic arrivals as a function of receiver offset at constant drill bit depth.
FIG. 3 is a display showing seismic arrivals as a function of drill bit depth at constant receiver offset.

FIG. 2 is a display showing event arrival times as a function of receiver offset for a constant drill-bit depth of 5610 feet. The direct arrivals are shown at 58. The pattern of the direct arrivals exhibits the expected hyperbolic shape.

The head wave arrivals are shown at 60. The head wave arrivals plot along a substantially straight line provided that the formation velocity remains substantially constant with increasing depth. If projected back to zero offset at the well head 35, the arrivals would have a zero intercept time. The head wave arrivals from a distributed seismic energy source can be distinguished from arrivals from point sources along the drill string on the basis of moveout with respect to receiver offset. If the arrivals were due to point sources along the drill string, they would necessarily exhibit hyperbolic rather than linear moveout.

A trace at a given offset can record several head wave arrivals from different source depths. Near offsets receive head waves from waveguide depths corresponding to shallow, low velocity formations or to deep, very high velocity formations. The trajectory of arrivals from formations having a propagation velocity approximating that of the drill string will be relatively steep. Longer receiver offsets record head wave arrivals over a wider range of wave guide depths, particularly for intermediate formation velocities whose trajectories will be somewhat less steep.

The formation velocity for some of the formations in which the head wave arrivals were initiated can be estimated by inspection of a display such as FIG. 2. The apparent velocity can be calculated from knowledge of the extensional-wave propagation velocity $V_{ds}$ in the drill string and from measurement of the slowness, p, of the head wave arrivals. The parameter p is a function of the difference in travel time with respect to unit distance, that is, $$p = \Delta t / \Delta x. \tag{3}$$

The value of p can be measured from a display of time vs. receiver offset. For the example of FIG. 2, p, as measured from the display, is about 0.140 second per 1000 feet. The formation velocity can be estimated from the formulation:

$$V_f = V_{ds}(1/\{1 + V_{ds}^2 p^2\}^{0.5}). \tag{4}$$

Given a drill string velocity of 15,600 fps, the formation velocity $V_f$, turns out to be about 6500 fps. The above calculations ordinarily would be carried out in processor 44 by use of any well-known computer-aided data-processing routine.

The rig arrival is identified at 62 and, like the head waves, it is linear with offset. The rig arrival will be nearly coincident with the refracted arrival at zero offset but lags behind both the direct arrival and the head waves because the formation velocity near the surface is much slower than is the formation velocity at depth. The event at 64 is a drill string multiple.

FIG. 3 is a display of the respective direct arrivals 58, head waves 60 and rig arrivals 62, as a function of correlated travel time vs. drill bit depth for a constant offset of 2532 feet. It is to be understood that data from any one of the offsets can be used for this format, at the option of the investigator. As stated earlier, the arrival time of the direct arrival is a function of drill-bit depth. However, the rig arrivals and the head-wave arrivals are independent of drill bit depth as explained in the next paragraph.

With respect to FIG. 3, the head wave 60 exhibits no change as the depth of the drill bit increases because the intersection of the head wave with the drill string is the same regardless of the drill-bit depth. The head wave traveling in the earth is created by the extensional wave traveling up the drill string, which is the same wave that the accelerometer records. As the drill bit moves deeper, both the head waves recorded by the receivers 26-32 and the extensional wave arrivals recorded by the accelerometer 20 are retarded by the same delay time and therefore the moveout of the head wave arrivals is zero regardless of the receiver offset, the borehole deviation or the formation velocity. The drill bit depth at which the head wave intersects the direct arrival determines the intersection depth of the head wave and the waveguide such as a drill string. In FIG. 3, the intersection depth is slightly above 3000 feet as shown by the arrow at A. The head wave does not exist above that intersection depth. The slowness, p, can be combined with a display such as FIG. 3, to provide an estimate of the emanation depth of the head wave. From that information, one can obtain a unique estimate of the velocity appropriate to the head-wave emanation depth.

Although the particular ways and methods discussed herein for practicing this invention have been described with some degree of specificity, it must be understood that the information was presented by way of example only and not by way of limitation. It is preferred to use a rotating drill bit in a well being actively drilled as a means for exciting the drill string to act as a distributed seismic energy source. But any other means may be used to excite the drill string such as applying an external programmable vibrator device to the top of the drill string. The vibrator could be programmed to provide a chirp signal or a pseudo-random vibratory signal to a waveguide such as a drill string. Alternatively, one could raise the drill string a few feet and then drop it so as to forcefully impact the bottom of the hole to create the required excitation. In place of using the drill string as a waveguide, one could use the casing in a cased well, or, perhaps, the production tubing in a completed well. The casing or tubing could be excited by an external vibrator as above explained. The teachings of this disclosure are limited only by the appended claims.

What is claimed is:

1. A system for seismic exploration from a fluid-filled borehole that penetrates a plurality of earth formations to a plurality of different borehole depths, comprising:
    an elongated waveguide inserted into said borehole, said waveguide having an extensional-wave phase velocity greater than the acoustic-wave propagation velocity through said earth formations;
    means for exciting extensional waves distributed along the length of said wave guide for radiating an extended acoustic wavefield therefrom into said earth formations to generate head waves therein;
    means, disposed at a plurality of discrete locations, offset from said borehole, for detecting the generated head waves;
    means for detecting the extensional waves traveling up said elongated waveguide;

means for contemporaneously sampling and recording the detected head waves and the detected extensional waves;

means for cross-correlating the sampled head waves with the contemporaneously sampled extensional waves to generate a plurality of cross-correlograms; and means for displaying said cross-correlograms.

2. The system as defined by claim 1, comprising: means for displaying said cross-correlograms as a function of travel time vs. location-offset for a fixed borehole depth.

3. The system as defined by claim 1 wherein: said elongated waveguide is a sectionalized drill string and said means for exciting is a rotating drill bit affixed to the lower end of said drill string.

4. The system as defined by claim 1, comprising: means for displaying a plurality of cross-correlograms from any one of said discrete locations as a function of travel time vs. bore-hole depth.

5. The system as defined by claim 4, comprising: means, coupled to said means for displaying, for estimating the emanation depth of said head waves.

6. The system as defined by claim 1, comprising: means, coupled to said means for sampling, recording and cross-correlating, for estimating the propagation velocity of said head waves as initiated from at least some of said earth formations.

7. A method of seismic exploration from a fluid-filled borehole that penetrates an earth formation, comprising:

inserting an elongated acoustic waveguide into said borehole, said waveguide having a preselected extensional-wave phase velocity, $V_{ds}$;

exciting extensional waves along said acoustic waveguide to radiate a distributed wavefield into said earth formation for generating head waves in said formation;

detecting the generated head waves at a plurality of discrete locations;

contemporaneously detecting extensional waves traveling through said waveguide; and cross-correlating the head waves, as detected at each of said plurality of discrete locations, with said contemporaneously detected extensional waves to provide a plurality of cross-correlograms.

8. The method as defined by claim 7, wherein: said plurality of discrete locations are offset horizontally from the borehole, near the surface of the earth.

9. The method as defined by claim 7, comprising: from said cross-correlograms, estimating the propagation velocity of said head waves through at least some of the earth formations.

10. The method as defined by claim 8, comprising: displaying said plurality of cross-correlograms as function of arrival time vs. horizontal offset for a constant borehole penetration depth.

11. The method as defined by claim 10, comprising: identifying head-wave arrivals from the plurality of displayed cross-correlograms;

measuring the slowness, p, of said head-wave arrivals as a function of the difference in arrival time per unit of offset distance;

estimating the formation velocity $V_f$ through at least one of said earth formations from the formulation $$V_f = V_{ds}(1/\{1+V_{ds}^2 p^2\}^{0.5}).$$

12. A method of seismic exploration from a borehole that penetrates an earth formation, comprising:

inserting a waveguide acting as a distributed seismic energy source into the borehole to a plurality of preselected depths said waveguide having an acoustic-wave phase velocity exceeding the propagation velocity of an acoustic wavefield in the formation;

exciting acoustic waves along said distributed seismic energy source to generate an acoustic wavefield in the surrounding earth formations;

detecting the so-generated acoustic wavefield at a plurality of discrete locations;

from the wavefields, as detected at the respective discrete locations, identifying head waves from other wavefield arrivals on the basis of travel-time delay and moveout; and using the identified head waves to estimate properties of the earth formations surrounding said borehole.

13. The method as defined by claim 12, wherein: at least one said property is the head-wave propagation velocity through said earth formations.

14. The method as defined by claim 12, comprising: from said identified head waves, estimating the emanation depth of said head waves and the head-wave propagation velocity unique to said emanation depth.

15. The method as defined by claim 12, comprising: detecting and sampling the acoustic waves as excited along said distributed seismic energy source;

contemporaneously sampling the acoustic wavefields as detected at the respective discrete locations;

cross-correlating the detected, sample acoustic waves with the contemporaneously sampled acoustic wavefields to provide a plurality of cross-correlograms; and displaying said cross-correlograms.

16. The method as defined by claim 15, comprising: offsetting said plurality of discrete locations horizontally from said borehole at a corresponding plurality of different distances.

17. The method as defined by claim 16, comprising: displaying said plurality of cross-correlograms as a function of correlated wavefield travel time vs. horizontal offset for a preselected insertion depth of said distributed seismic energy source.

18. The method as defined by claim 16, comprising: displaying a plurality of cross-correlograms from any one of said discrete offset locations as a function of correlated wavefield travel time vs. the depth of inserting of said distributed seismic energy source in said borehole.

19. For use in seismic exploration, a distributed seismic energy source, comprising:

an elongated waveguide that penetrates earth formations along a substantially vertical plane, the waveguide having an acoustic-wave phase velocity which exceeds the propagation velocity of head waves travelling through said formations;

means for exciting acoustic waves along said elongated waveguide so that seismic energy is radiated from said elongated waveguide into said formations as a single extended wavefield to generate head waves in said formation.

* * * * *